(12) United States Patent
Fischer

(10) Patent No.: US 11,904,793 B2
(45) Date of Patent: Feb. 20, 2024

(54) AIRBAG MODULE

(71) Applicant: TRW AUTOMOTIVE GMBH, Alfdorf (DE)

(72) Inventor: Anton Fischer, Schechingen-Leinweiler (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 17/281,277

(22) PCT Filed: Oct. 1, 2019

(86) PCT No.: PCT/EP2019/076510
§ 371 (c)(1),
(2) Date: Mar. 30, 2021

(87) PCT Pub. No.: WO2020/070091
PCT Pub. Date: Apr. 9, 2020

(65) Prior Publication Data
US 2022/0001830 A1    Jan. 6, 2022

(30) Foreign Application Priority Data
Oct. 1, 2018   (DE) .................. 10 2018 124 250.6

(51) Int. Cl.
*B60R 21/261*    (2011.01)
*B60R 21/231*    (2011.01)

(52) U.S. Cl.
CPC .......... *B60R 21/261* (2013.01); *B60R 21/231* (2013.01); *B60R 2021/2612* (2013.01)

(58) Field of Classification Search
CPC ... B60R 21/261; B60R 21/231; B60R 21/232; B60R 21/26; B60R 21/213;
(Continued)

(56) References Cited

U.S. PATENT DOCUMENTS

| 6,082,761 | A  | * | 7/2000 | Kato  | ............... | B60R 21/213 |
|   |   |   |   |   |   | 280/730.2 |
| 6,293,581 | B1 | * | 9/2001 | Saita | ............... | B60R 21/213 |
|   |   |   |   |   |   | 280/730.2 |

(Continued)

FOREIGN PATENT DOCUMENTS

DE   202005019014 U1   5/2006
DE   102006014823 A1   10/2007
(Continued)

OTHER PUBLICATIONS

PCT International Search Report for corresponding International Application Serial No. PCT/EP2019/076510, dated Jan. 3, 2020, pp. 1-5.

*Primary Examiner* — Keith J Frisby
(74) *Attorney, Agent, or Firm* — TAROLLI, SUNDHEIM, COVELL & TUMMINO L.L.P.

(57) ABSTRACT

An airbag module (10) comprises an airbag (12) including two outer wall layers (18) which are interconnected at a circumferential joint (22) along a circumferential edge (20) of the airbag (12) and which delimit an interior of the airbag (12) fillable with gas, wherein an opening (26) which is in fluid communication with the fillable interior of the airbag (12) is provided in the circumferential joint (22), and a plug (14) which is permanently inserted in the opening (26). The plug (14) includes a passage (16), and an outer circumferential surface (32) of the plug (14) is sealed against an inner edge (28) of the opening (26).

16 Claims, 2 Drawing Sheets

(58) Field of Classification Search
CPC ......... B60R 21/2171; B60R 21/23138; B60R 21/207; B60R 21/16; B60R 21/217; B60R 2021/2612; B60R 2021/2617
USPC .................. 280/728.1, 730.2, 736, 741, 742
See application file for complete search history.

(56) References Cited

U.S. PATENT DOCUMENTS

| | | | | |
|---|---|---|---|---|
| 6,808,203 B2* | 10/2004 | Takahara | .............. | B60R 21/232 280/740 |
| 6,846,010 B2* | 1/2005 | Enders | .................. | B60R 21/232 280/730.2 |
| 6,860,506 B2* | 3/2005 | Ogata | .................. | B60R 21/261 280/730.2 |
| 6,962,364 B2* | 11/2005 | Ju | ............................ | B60R 21/26 280/730.2 |
| 7,380,819 B2* | 6/2008 | Fricke | .................. | B60R 21/261 280/730.2 |
| 7,600,778 B2* | 10/2009 | Schang | ................. | B60R 21/232 280/736 |
| 7,938,443 B1* | 5/2011 | Smith | ................... | B60R 21/261 280/736 |
| 8,622,423 B1* | 1/2014 | Manire | ................. | B60R 21/232 280/736 |
| 10,053,047 B2* | 8/2018 | Jinnai | .................... | B60R 21/262 |
| 2002/0140211 A1* | 10/2002 | Takahara | .............. | B60R 21/261 280/730.2 |
| 2003/0090093 A1* | 5/2003 | Ikeda | ..................... | B60R 21/261 280/730.2 |
| 2004/0232664 A1* | 11/2004 | Tokunaga | ............... | B60R 21/26 280/730.2 |
| 2005/0134022 A1 | 6/2005 | Noguchi et al. | | |
| 2007/0063489 A1* | 3/2007 | Dinsdale | ............ | B60R 21/261 280/728.2 |
| 2008/0111357 A1* | 5/2008 | Heninger | ............ | B60R 21/2346 280/740 |
| 2011/0049848 A1* | 3/2011 | Walston | ............. | B60R 21/2171 280/730.2 |

FOREIGN PATENT DOCUMENTS

| | | | | |
|---|---|---|---|---|
| DE | 102013009723 A1 * | 12/2014 | ........... | B60R 21/217 |
| WO | 2002/079008 A1 | 10/2002 | | |

* cited by examiner

AIRBAG MODULE

RELATED APPLICATIONS

The present invention is a U.S. National Stage under 35 USC 371 patent application, claiming priority to Serial No. PCT/EP2019/076510, filed on 1 Oct. 2019; which claims priority from 10 2018 124 250.6, filed 1 Oct. 2018, the entirety of both of which are incorporated herein by reference.

TECHNICAL FIELD

The invention relates to an airbag module comprising an airbag including two outer wall layers that are interconnected at a circumferential joint along a circumferential edge of the airbag.

BACKGROUND

The problem arising with all airbags is to take the filling gas into the interior of the airbag, i.e., into the volume enclosed by the two outer wall layers, preferably without any losses. This applies especially to configurations in which portions of the inflator protrude directly into the airbag or in which a so-called gas lance is disposed between an inflator mounted remote from the airbag and the airbag, the open end of said gas lance being passed into the airbag. In both cases, at the transition into the airbag a complicated gastight connection must be established between the outer wall layers of the airbag and the circumference of the inflator or the gas lance. So far, for example a hose clip has been used for this purpose.

SUMMARY

It is the object of the invention to facilitate the gas supply into an airbag.

This object is achieved by an airbag module comprising the features of claim 1. The airbag module comprises an airbag including two outer wall layers which are interconnected at a circumferential joint along a circumferential edge of the airbag and which delimit an interior of the airbag that is fillable with gas. In the circumferential joint an opening is provided which is in fluid communication with the fillable interior of the airbag, wherein a plug including a passage is permanently inserted in the opening and wherein an outer circumferential area of the plug is sealed against an inner edge of the opening. The plug can be fabricated to have a definitely higher rigidity and higher dimensional stability than the material of the outer wall layers of the airbag and can be fixed in the opening within the airbag with little manufacturing effort. This allows for producing, with simple means, a transition from the ambience of the airbag into the interior thereof which has a defined cross-section.

The passage is primarily provided to receive a gas conduit that is in fluid communication with an inflator and guides the filling gas from the inflator into the interior of the airbag, the gas conduit including at least one discharge opening through which filling gas flows out of the gas conduit into the airbag. The gas conduit merely has to be inserted into the passage of the plug to provide a fluid communication between the gas conduit and the airbag, which facilitates the assembly.

The gas conduit may be, for example, part of a gas lance connected to the inflator, part of a gas conducting element disposed directly on the inflator or else part of the inflator itself. In this way, different techniques of gas supply can be easily implemented. Merely the cross-sectional surface of the passage has to be adapted to the cross-section of the respective gas conduit used.

The difficulties of sealing the outer wall layers of the airbag directly opposed to a gas conduit are by-passed by using the plug inserted into the airbag. Typically, the gas conduit is sealed against an inner wall of the passage, which can be easily achieved by common means. For example, the sealing effect can be obtained by a form closure, especially between sealing lips or sealing rings on the inside of the passage and/or on an outside of the gas conduit. However, it is also imaginable, for example, to bond or weld the inner wall of the passage with the gas conduit in a gastight manner.

In order to facilitate assembly and sealing, the gas conduit should include a rigid outer wall at least in the area of the passage, however.

So as to safely guide the gas conduit into the interior of the airbag, the passage advantageously extends through the entire plug and forms a continuous opening between the two axial ends of the plug.

The dimensions of the plug and the dimensions of the circumferential joint and the opening should be adapted to one another. Since the circumferential joint usually has a width of several centimeters (when viewed into the airbag surface area), also the inner edge of the opening, the plug and the passage typically have an axial length of several centimeters. Those skilled in the art can adapt the exact measures to the current situation, as a matter of course.

The axial direction of the plug is preferably perpendicular to the extension of the circumferential joint in the area of the opening so that the axial length of the plug is at least as large as the width of the circumferential joint. The plug may terminate with the circumferential joint inside the airbag, but it may as well be longer and may project from the circumferential joint in the interior of the airbag.

As is conventionally known, the circumferential joint between the two outer wall layers of the airbag may be sewn, woven, welded or bonded. Frequently, the circumferential joint is arranged to be offset a short distance into the surface area of the airbag against the actual circumferential edge of the outer wall layers.

The airbag module can especially be a side airbag module mounted on the roof rail or in a seat back of a vehicle seat.

The plug can be tightly inserted into the airbag already before the gas conduit is mounted.

The outer wall layers of the airbag are preferably located at the inner edge of the opening fully adjacent to the outer circumferential surface of the plug to facilitate the sealing.

At its outer circumference, the plug may include at least one sealing lip which produces the sealing between the inner edge of the opening and the outer circumferential surface of the plug. Preferably, plural sealing lips arranged in series along the axial direction of the plug are provided. The sealing lip(s) may also fix or contribute to fix the plug within the opening.

For sealing and, at the same time, for fixing the plug on the airbag, it is also possible to bond or weld the plug at its outer circumferential surface with the edge of the opening as well. In this way, too, a tight and gastight connection can be easily produced. A welded or bonded connection may be provided alternatively or additionally, e.g., in addition to one or more sealing lips on the outer circumference of the plug.

The opening in the airbag can be easily produced in that the circumferential joint is interrupted at that location.

Mounting of the plug is facilitated when the circumferential joint extends linearly in the area of the opening.

However, the edge of the opening is not intended to project beyond a neighboring portion of the circumferential edge, and thus no "snorkel" is formed for fastening a hose clip to the airbag.

The plug is simply inserted into the opening and is advantageously fixed exclusively at the inner edge of the opening.

Optionally, at its outer axial end, the plug includes a retaining plate that has a larger surface area than the opening and that prevents the plug from being completely inserted into the airbag.

BRIEF DESCRIPTION OF THE FIGURES

In the following, the invention shall be described in detail by way of plural example embodiments with reference to the enclosed drawings, wherein.

DETAILED DESCRIPTION

Figure 1:
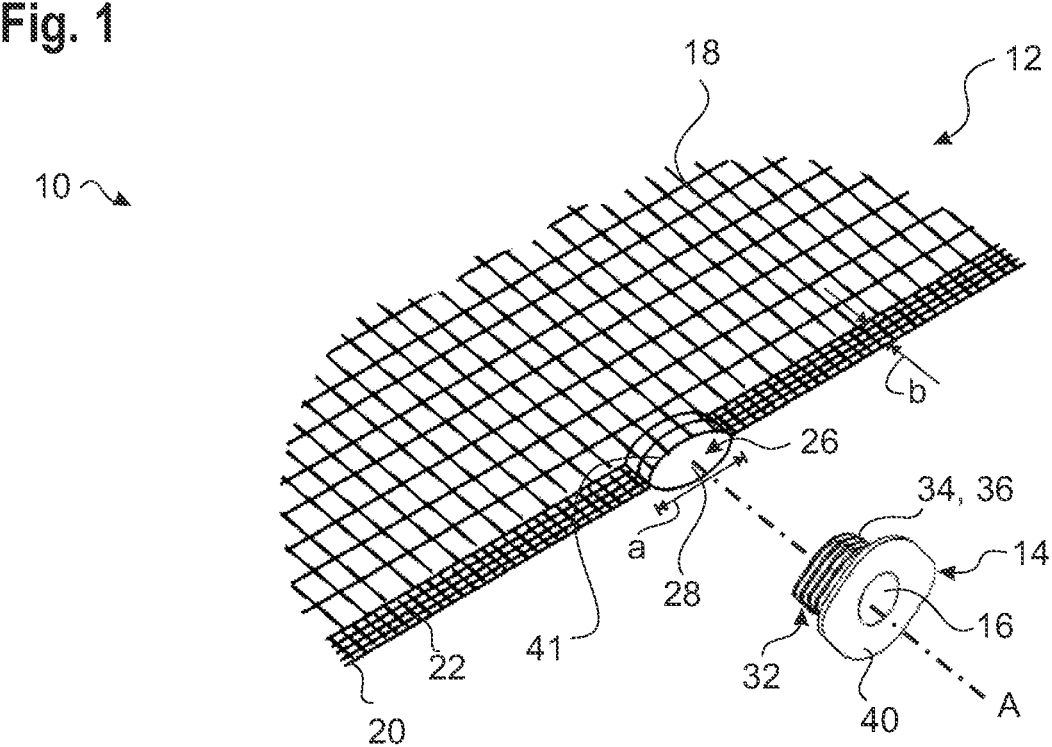
FIG. 1 schematically shows a cutout of an airbag module according to the invention comprising an airbag and a plug to be mounted thereon according to a first embodiment.

FIG. 1 illustrates an airbag module 10 comprising an airbag 12 and a plug 14 having a passage 16 that extends along an axial direction A. FIG. 1 illustrates the individual components prior to assembly. In the completed airbag module 10, the plug 14 is inserted tightly and permanently in the airbag 12.

Figure 2:
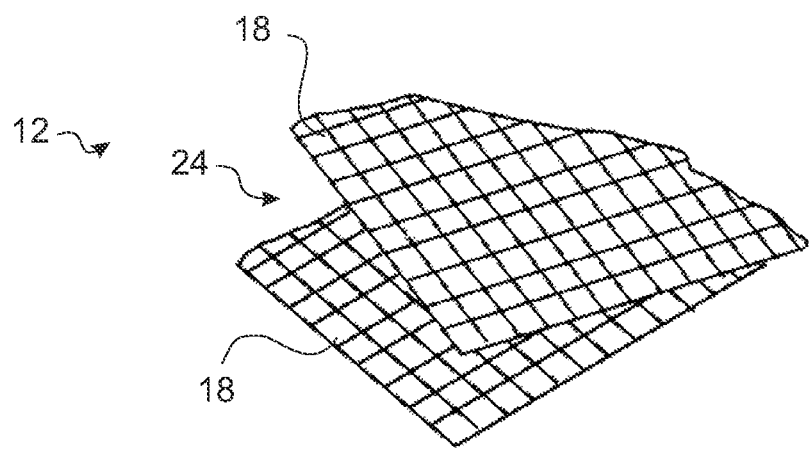
FIG. 2 schematically shows the two outer wall layers of the airbag from FIG. 1.
Figure 3:
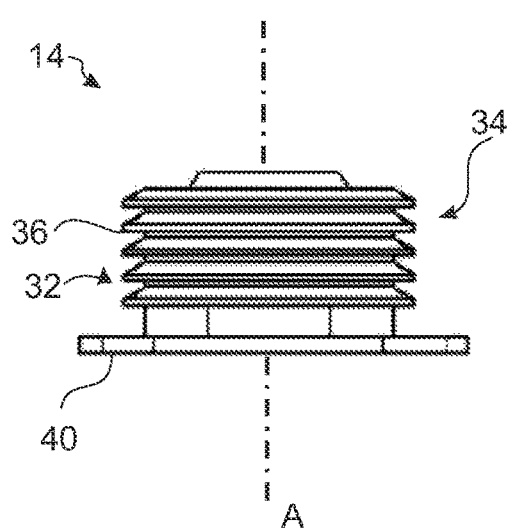
FIG. 3 shows a side view of the plug from FIG. 1.

The airbag 12 includes, as conventionally known, two superimposed outer wall layers 18 (see FIG. 2) which are interconnected in a gastight manner along a circumferential edge 20 by means of a circumferential joint 22 so that they enclose an interior 24 of the airbag 12 fillable with gas.

The circumferential joint 22 is produced, e.g., by sewing, weaving, bonding or welding the two outer wall layers 18 to each other.

In a portion of the circumferential joint 22 extending linearly in this case, an opening 26 is provided that is formed by the circumferential joint 22 being interrupted in this area of the circumferential edge 20 and, hence, the two outer wall layers 18 not being fixed directly to each other. Portions of the circumferential joint 22 on opposite sides of the opening 26 extend co-linearly with each other.

The opening 26 extends completely through the circumferential joint 22 into the interior 24 of the airbag 12 and thus provides a fluid communication from the ambience of the airbag 12 to the interior 24 thereof.

A width b of the circumferential joint 22 usually ranges from few millimeters to few centimeters, when viewed from the actual circumferential edge 20 into the surface area of the airbag 12, which is predetermined by the geometry and the manufacturing mode of the airbag 12. An inner edge 28 of the opening 26 correspondingly extends toward the surface area of the airbag 12 over the same dimensions.

Along the circumferential edge 20, a length a of the opening 26 is defined by the desired type of the gas supply for the airbag 12, as the dimensions of the plug 14 naturally have to be adapted to the dimensions of a gas conduit 30 (see FIG. 4) which is to be passed through the passage 16 into the interior 24 of the airbag 12.

An outer circumferential surface 32 of the plug 14 is provided with a structure 34 that facilitates a gastight connection between the outer circumferential surface 32 and the inner edge 28 of the opening 26.

In the first embodiment shown in FIGS. 1 to 4, said structure 34 is materialized by a number of sealing lips 36 arranged in series in the axial direction A.

Figure 5:
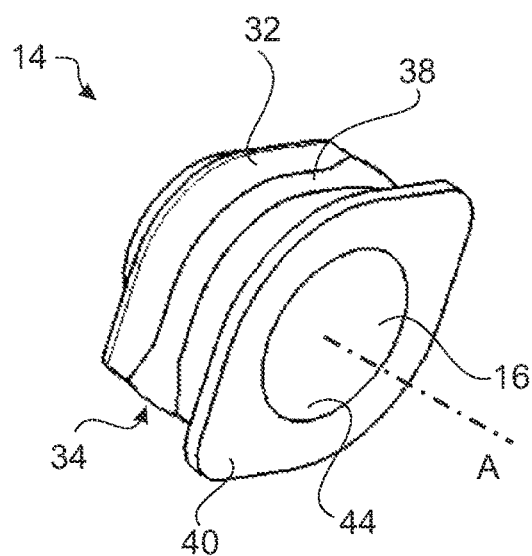
FIGS. 5 and 6 show different views of a plug of an airbag module according to the invention as set forth in a second embodiment.
Figure 6:
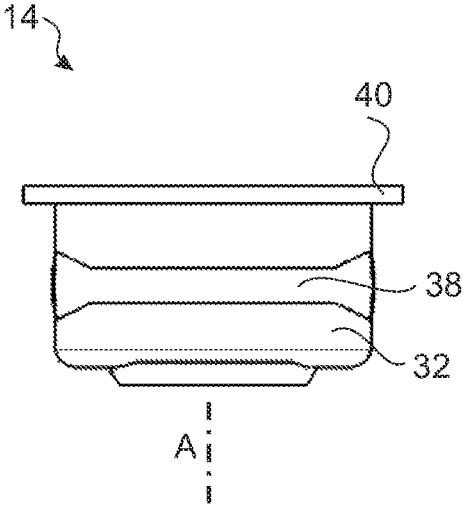

In the second embodiment shown in FIGS. 5 and 6, the structure 34 is an adhesive surface 38 to which a suitable adhesive is applied. Optionally, the adhesive surface 38 may be a recess or an elevation.

It is also possible, of course, to combine plural fastening techniques and to provide, for example, sealing lips 36 additionally with a suitable adhesive. It would also be imaginable to weld, alternatively or additionally, the inner edge 28 of the opening 26 with the outer circumferential surface 32 of the plug 14.

The plug 14 is tightly connected to the airbag 12 by inserting the plug 14 along the axial direction A into the opening 26 and connecting the same over the entire circumference of the outer circumferential surface 32 to the outer wall layers 18 in a gastight manner.

Accordingly, the structure 34 facilitates the sealing between the outer circumferential surface 32 of the plug 14 and the inner edge 28 of the opening 26. Via the structure 34, the plug 14 is also connected to the airbag 12 in a tight and non-destructively detachable manner, either by form closure or, alternatively or additionally, by adhesive bond.

Optionally, the plug 14 includes a retaining plate 40 having a larger diameter than the remaining plug 14 which is provided at the axial end of the plug 14 that is not inserted into the opening 26. The retaining plate 40 prevents the plug 14 from being inserted too far into the opening 26. In the mounted state, the retaining plate abuts against the outer edge 41 of the opening 26 on the circumferential edge 20.

In the completed airbag module 10, the passage 16 inside the plug 14 forms a fluid communication from the ambience of the airbag 12 to the interior 24 thereof.

The outer circumferential surface 32 of the plug 14 in cross-section may have a surface of any shape such as circular, oval or elliptical. Here is shown an elliptical shape which tapers at each end of the long axis. The cross-sectional area is thus adapted to the shape of the opening 26 formed between the two superimposed outer wall layers 18 and to the lateral transition thereof to the adjacent portions of the circumferential joint 22.

Also, the cross-sectional area of the passage 16 can be selected at will.

After the plug 14 is tightly connected to the airbag 12, a fitting gas conduit is inserted through the passage 16 into the interior 24 of the airbag 12.

The gas conduit 30 is appropriately connected to an inflator (not shown) which supplies the filling gas for inflation of the airbag 12.

The gas conduit 30 is, for example, a so-called gas lance that is connected to an inflator arranged remote from the airbag 12, but it can also be part of the inflator itself or any other gas conducting element which is appropriately fluid-communicated with an inflator.

Figure 4:
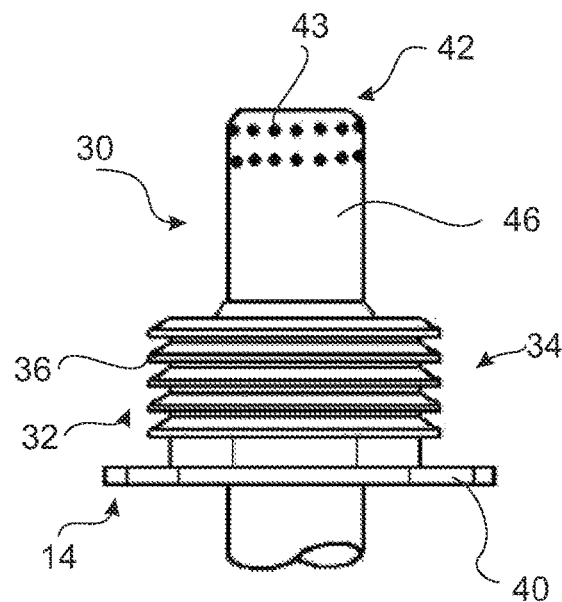
FIG. 4 shows the plug from FIG. 3 with an inserted gas conduit.

In the example shown in FIG. 4, the gas conduit 30 is a gas lance which, apart from an outlet area 42 having a plurality of individual outlet openings 43 at its axial end located in the airbag 12, is configured to be gastight.

An inner wall 44 of the passage 16 inside the plug 14 is configured so that a gastight connection to a rigid outer wall 46 of the gas conduit 30 can be established. For example, a suitable sealing structure, especially including sealing lips, may be provided, but also an adhesive bond is imaginable, for example.

Of course, the gas conduit 30 may also be pre-assembled on the plug 14 when the plug is fixed in the opening 26 of the airbag 12.

Additional securing of the plug 14 or the gas conduit 30 on the airbag 12 is not provided.

The invention claimed is:

1. An airbag module comprising an airbag including two outer wall layers which are interconnected at a circumferential joint that extends linearly along a circumferential edge of the airbag and which delimit an interior of the airbag fillable with gas, wherein an opening that is in fluid communication with the fillable interior of the airbag is formed as an interruption in the linearly extending circumferential joint so that portions of the circumferential joint on opposite sides of the opening extend co-linearly with each other, wherein a plug that includes a passage is permanently inserted in the opening, wherein an axial direction of the plug extends perpendicular to the co-linear extension of the portions of the circumferential joint on opposite sides of the opening, and wherein an outer circumferential surface of the plug is sealed against an inner edge of the opening.

2. The airbag module according to claim 1, wherein in the passage a gas conduit is inserted which is in fluid communication with an inflator and which guides the filling gas from the inflator into the interior of the airbag, wherein the gas conduit has at least one outlet opening through which filling gas flows out of the gas conduit.

3. The airbag module according to claim 2, wherein the gas conduit is part of a gas lance connected to the inflator, part of a gas conducting element disposed on the inflator or part of the inflator itself.

4. The airbag module according to claim 2, wherein the gas conduit is sealed against an inner wall of the passage.

5. The airbag module according to claim 2, wherein the gas conduit includes a rigid outer wall at least in the area of the passage.

6. The airbag module according to claim 1, wherein, at the inner edge of the opening, the outer wall layers are flatly adjacent to the outer circumferential surface of the plug.

7. The airbag module according to claim 1, wherein the plug includes at least one sealing lip on its outer circumferential surface.

8. The airbag module according to claim 1, wherein, on its outer circumferential surface, the plug is bonded or welded to the inner edge of the opening.

9. The airbag module according to claim 1, wherein the circumferential joint has a width measured perpendicular to the linear direction along which the circumferential joint extends, and wherein the inner edge of the opening in the circumferential joint has a width that corresponds to the width of the circumferential joint on opposite sides of the opening.

10. The airbag module according to claim 9, wherein the plug comprises an outer circumferential surface having a length that corresponds to the width of the inner edge of the opening.

11. The airbag module according to claim 10, wherein the outer circumferential surface of the plug comprises a plurality of sealing lips configured to engage the opening.

12. The airbag module according to claim 11, further comprising an adhesive for fastening the sealing lips in the opening.

13. The airbag module according to claim 10, wherein the outer circumferential surface of the plug comprises an adhesive surface for receiving an adhesive, the adhesive surface comprising a recess or an elevation on the outer circumferential surface of the plug.

14. The airbag module according to claim 10, wherein the plug comprises a retaining plate positioned adjacent to and extending radially outward from the outer circumferential surface of the plug, the retaining plate being configured to engage edges of the outer wall layers at the opening and to block over-insertion of the plug into the opening.

15. The airbag module according to claim 1, wherein no snorkel is formed for fastening a hose clip to the airbag.

16. The airbag module according to claim 1, wherein the interruption is configured so that an edge of the opening does not project beyond neighboring portions of the circumferential edge.

* * * * *